United States Patent Office

3,262,864
Patented July 26, 1966

3,262,864
PROCEDURE FOR DEVELOPING ANTIMICROBIAL ACTIVITY IN NON-PATHOGENIC ORGANISMS
Georges Kouchner, Fontenay-sous-Bois, France, assignor of fifty percent to Societe Civile de Recherches Scientifiques et Industrielles "Sodersi," Paris, France, a company of France
No Drawing. Filed Mar. 2, 1962, Ser. No. 177,702
Claims priority, application France, Mar. 3, 1961, 854,461, 854,462; Feb. 26, 1962, 889,179, 889,204
13 Claims. (Cl. 195—96)

This invention relates to a process for providing active microorganisms having an adapted and developed antibiotic activity against other predetermined microorganisms. It also relates to the active, specific microorganisms obtained by such process, and more particularly to non-pathogenic colibacilli, and pharmaceutical preparations enclosing such active microorganisms.

Certain microorganisms are very important in the establishment and maintenance of a bacterial equilibrium necessary not only in every state of life (in the fields of human and veterinary therapeutics) but also in many other fields; for example in housing sanitation, more particularly in stables and stock-farms, in the disinfection of surfaces, air and other media, in alimentation of animals, in fodder preservation, in the treatment of ground, compost and manure, in the prevention of undesirable prolific growth, and inoculation of cesspools. Such microorganisms may also advantageously be used in fermentation industries, especially in the manufacture of beer, cheese and alcohol.

Up to now, it has been current practice to stop prolific growth of undesirable microorganisms by means of non-living antiseptic substances or antibiotics of mineral, organic or animal orgin. However the use of such conventional substances has many inconveniences for although in some cases they may exhibit a sufficient activity, this activity is in most cases not a specific one. In other words, such substances destroy without distinction the useful microorganisms as well as the undesirable ones. This holds true as a general rule for physical agents such as heat, ultraviolet rays or ultrasonic waves. Re-inoculation of media so sterilized is difficult and risky since undesirable microorganisms may grow before the desriable ones and hamper, or even stop, the growth of useful microorganisms.

The microorganisms obtained according to this invention are, on the contrary, useful and living; they are especially trained to fight the undesirable microorganisms they might encounter. Thereby, the inoculation of a sterile or contaminated medium with microorganisms obtained according to this invention allows a predetermined microbial equilibrium to be established in these media.

It is an object of the invention to provide a process for obtaining active microorganisms having an adapted and developed antibiotic activity against other predetermined microorganisms, which process consists in cultivating said microorganisms together at least once in a common culture medium, isolating from this common culture medium at least one strain of surviving active microorganisms, and growing separately said strain of active microorganisms, whereby the antibiotic activity of the latter is developed and adapted to the particular application envisaged.

In one embodiment of the invention the two above mentioned species of microorganisms are first isolated in the form of pure strains, then the microorganisms of these pure strains are mixed in predetermined proportions with the others. It is also possible to grow the active microorganisms alternatively separately and together with the other microorganisms. Furthermore the active microorganisms of one strain may be cultivated in several culture media together with other microorganisms, while the proportion of active microorganisms is decreased in each common culture medium with respect to the preceding one. The microorganisms may also be grown in the common culture medium, or in one of the common culture media, until only active microorganisms have survived in said medium.

At least one of the common culture media may be more favorable to the active microorganisms than to the other microorganisms, and the latter may be adapted to this medium by growing separately at least once in this medium before being grown in common with the active microorganisms.

At least one of the culture media uses may be a natural culture medium such as fecal matter, when the active microorganisms are non-pathogenic colibacilli, and isolate from this natural culture medium the active microorganism which eventually will predominate.

The active microorganisms may be, in particular, the non-pathogenic colibacilli, the streptomyces, the penicillins. The above mentioned other microorganisms may be constituted by pathogenic bacteriae of the group including staphlococci, streptococci, Klebsiella, Shigella, *Candida albicans*, and the Koch bacillus.

The non-pathogenic colibacillus is a normal physiological host found in man, and its presence is necessary for normal intestinal functions, especially for the endointestinal synthesis of vitamins. For the treatment of numerous affections, septic ones in particular, antiseptics and antibiotics are frequently used which destroy at least the greatest portion of intestinal flora, and frequently bring about secondary affections of the enteric type. To counteract this destruction of the intestinal flora, patients treated with antibiotics or antiseptics, such as streptomycin, tetracyclin, chloramphenicol and similar products, will generally have to take germs of the subtilis type as well as lactobacilli which are occasional hosts in the intestinal tract.

In addition to the colibacilli cited above, there are other colibacilli of the paracoli or coliform type which can be isolated in pathological susbtances such as purulent urine, hemocultures or abcess pus but do not show the advantage of the non-pathogenic colibacilli. The different pathogenic and non-pathogenic colibacilli as well as the pathogenic enterobacteriaceae such as "Salmonella," the dysenteric bacilli, staphylococci and streptococci grow almost the same way in the usual standard culture medium. It is therefore quite difficult to obtain pure cultures of non-pathogenic colibacilli according to the standard procedures.

The present invention also allows to provide selectively cultures of non-pathogenic colibacilli with excellent yields, according to a process which consists in isolating such colibacilli from normal human stools of healthy subjects where said colibacilli have grown in the presence of other microorganisms which have penetrated the intestine, and then cultivating these colibacilli in a sterile, selective culture medium enriched with vitamins.

The present invention also relates to composition for the treatment of intestinal flora unbalance. This composition constituted at least in part, by non-pathogenic living colibacilli. One advantage of this composition resides in the possibility of either introducing or maintaining an essential germ without the introduction of foreign elements.

When such composition or preparation is to be stocked during a normal period of time, the freshly obtained preparation is distributed in vial ampules which are then lyophilized under aseptic conditions.

Non-pathogenic colibacilli can be isolated by removing fraction of fecal matter and inoculating the same in a culture medium allowing of enrichment and prolific growth, incubating therein at 37° C., then inoculating in a medium allowing of selection and prolific growth, incubating therein at 37° C., inoculating the selected colibacilli in a broth for their prolific growth, incubating therein at 37° C., and finally separating the non-pathogenic colibacilli after identifying them.

The selective culture medium is an aqueous solution containing at least one vitamin of the group constituted by the vitamins A, B, C, D, E and PP. Such a medium can also enclose an emulsifying agent, especially a sorbitol derivative. The pH of such a selective culture medium is advantageously basic and buffered.

In order to obtain living non-pathogenic colibacilli being easily preserved commercially, it is advantageous to lyophilize simultaneously the selective culture medium enriched with vitamins, and the colibacilli which have grown in it.

Other details and advantages of the invention will be apparent from the following examples.

*Example 1.*—Adaptation of the colibacillus to the inhibition of a pathogenic staphylococci.

A colibacillus is collected and incubated in an ordinary or nutrient broth.

Furthermore, a pathogenic staphylococci originating from any pathological substance (urine, pus, etc.) is also incubated in an ordinary or nutrient broth.

After 18 to 24 hours of incubation, 1 ml. of the culture containing the colibacillus and ¼ ml. of the culture containing the pathogenic staphylococci are placed in the same sterile broth tube and incubated at 37° C.

After 18 to 24 hours of incubation this common culture medium is diluted to ⅟₁₀₀₀. 2 ml. of this dilution is placed in nutrient agar held in fusion below 50° C. in a Petri dish.

After a 24 hour incubation, colonies of each type of bacteriae are obtained. The colibacilli are isolated and incubated in broth during 24 hours.

½ ml. of this last culture and ½ ml. of the nutrient broth containing the pathogenic staphylococci are poured together into a new sterile broth tube which is then incubated for 18 to 24 hours.

The agar in a Petri dish is again inoculated as previously shown. The colibacilli are then isolated and incubated in a broth.

After 18 to 24 hours, ¼ ml. of this culture and 1 ml. of the pathogenic staphylococcal culture are poured together into a new sterile broth tube. After a 24 hour incubation, a new selection is performed on agar in a Petri dish.

It will then be seen that the staphylococcal colonies are extremely rare, or almost non-existent. Should this not be the case, the adaptation process is continued by repeating the same operations, as indicated above, until the inhibiting power of the colibacilli is such that the staphylococcal colonies will not exceed 10% of the colibacillary colonies.

*Example 2.*—The same procedure as in Example 1, but replacing the staphylococci by streptococci, whereby the resulting colibacilli are adapted to the inhibition of streptococci.

*Example 3.*—The same procedure as in Example 1, but using a mixture of Klebsiella and Shigella instead of staphylococci, whereby the resulting colibacilli are adapted to a simultaneous inhibition of the Klebsiella and Shigella.

*Example 4.*—Adaptation of the colibacillus to the inhibition of *Candida albicans*.

A test tube containing "T" broth (Chapoteaux peptone 40 g., NaCl 5 g., glucose 2 g., water 1000 ml., pH 7.5 adjusted with NaOH) is inoculated with two platinum loopfuls of *Candida albicans* colonies grown on polysaccharide solid medium (glucose 1 g., maltose 1 g., dextrine 1 g., agar 100 g.) or on "P.C.B." medium (tap water 1000 ml., potato pulp 20 g., carrot pulp 20 g., agar 20 g.) prepared by macerating the pulps during 1 hour followed by boiling during 5 minutes and by filtering through cotton and by adding the agar before autoclaving. The sterilization temperature is slowly raised to 120° C. and maintained as such during 15 minutes before the medium is distributed in tubes.

After 48 hours, 2 drops of this culture medium is added into a tube containing the "T" broth and where 1 ml. of the culture containing the colibacillus (as prepared in Example 1) has been previously added. One colony of colibacillus is removed, and re-inoculated into a "T" broth tube in order to obtain a pure culture of colibacilli after a 24 hour incubation at 37° C.

1 ml. of this culture is inoculated into a "T" broth tube and 4 drops of a *Candida albicans* broth culture are added into it.

After 48 hours of incubation, a new selection is made on agar, and then, in the same way as previously, a pure culture of colibacilli is prepared and one ml. of this pure culture is inoculated into a new sterile "T" broth tube together with 8 drops of a *Candida albicans* culture. These operations of preparing a common culture of colibacilli and *Candida albicans* and an isolated culture of colibacilli are repeated while increasing each time the proportion of *Candida albicans* until equal quantities of each culture are present. Finally a partial, if not total, inhibition of the *Candida albicans* growth by the colibacillus will result.

*Example 5.*—Adaptation of the colibacillus to the inhibtion of *Candida albicans*.

½ ml. of a *Candida albicans* broth culture and 1 ml. of a culture containing colibacilli as prepared in the previous examples are mixed in a "T" broth tube. The tube is incubated during 24 hours and the tube is left at about 20° C. for prolific growth. After a certain period of time, usually around 15 days to a month, one remarks that the colibacillus is the only survivor. It is then re-inoculated in broth.

The same operation is eventually repeated, which results in the total inhibition of *Candida albicans* after 5 to 15 days, depending on the strains.

*Example 6.*—Streptomyces adaptation to the inhibition of a pathogenic staphylococci.

An aqueous culture medium is prepared (fishmeat extract 1%, polypeptides 1%, dry barm 0.2%, glucose 1.5%, NaCl 0.5%) and autoclaved during 3 minutes at 110° C.

This medium is inoculated with a strain of *Streptomyces griseus* and with ½ to 1 ml. of a culture broth containing a pathogenic staphylococci, prepared as in Example 1 and incubated at 37° C.

The germs of the common culture are separated as in the preceding examples in order to obtain a strain of *Streptomyces griseus* having a higher antibiotic activity than the original strain in order to inhibit more easily the pathogenic staphylococci.

*Example 7.*—A common culture medium particularly favorable for the organisms which are to inhibit the *Candida albicans* is prepared. A culture of *Candida albicans* is grown in broth, then removed and finely crushed. It is then dried and weighed and an equal weight of distilled water is added. To the resulting aqueous mixture are added about 4% (of the mixture weight) of erepsin, about 4% of pancreatin (or trypsin) and about 4% of papain. This mixture is incubated at 37° C. during 48 hours before being filtered in order to obtain the liquid proteolytic extract of *Candida albicans*.

12.5 grams of this extract are mixed with 250 ml. of distilled water to which has been added 25 g. of lactose, glucose or a similar sugar. The common culture medium so prepared is distributed in Petri dishes, tubes or other convenient containers and is sterilized about 15 minutes at 110° C.

This common culture medium is used for the adaptation of the microorganisms to the inhibition of *Candida albicans* according to this invention. After having proceded as in Examples 4 and 5, it will be noted that the colibacilli grown in this proteolysate common medium become more rapidly active than those grown in the said examples.

*Example 8.*—A proteolysate common culture medium containing staphylococci is prepared. A strain of pathogenic staphylococci is grown in broth during 18 hours, It is then centrifuged for 3 minutes at 1000 r.p.m. and the sediment is collected. Lukewarm isotonic serum is added and it is again centrifuged in the same way. The new sediment is collected, then crushed, dried and treated so as to obtain a proteolytic extract, which is added to a common culture medium prepared as described in the 7th example. The culture medium so obtained promotes the adaptation of microorganisms to the inhibition of a pathogenic staphylococci, according to this invention, when used, for instance, as indicated in Example 1.

*Example 9.*—The same common culture medium as the one described in Example 6 is prepared, except that the polypeptides mentioned therein are replaced by the proteolytic extract of Example 8. The medium is then inoculated with a mixture of *Streptomyces griseus* and a pathogenic staphylococci, and after incubation at 37° C. the culture is left at about 20° C. for prolific growth, as in Example 5. One obtains, in this way, and in less than 15 days, a strain of *Streptomyces griseus* especially active against a pathogenic staphylococcus.

By using appropriate standard culture media, it is also possible to prepare proteolysates of other germs, especially of the Koch bacillus and to obtain, according to this invention, microorganisms of specific antibiotic activity which result is obtained by common culture growth of the microorganisms and germs in such media. In this manner it is possible to provide, or to increase a specific antibiotic activity in a microorganism, whereby specifically active antibiotics can be obtained, especially penicillins which are active against pathogenic staphylococci known to be "penicillo-resistant"; this result is obtained by growing the penicillium and the staphylococcus grow together in a common medium, in such proportions that the amount of penicillinase elaborated by the Staphylococcus is the "vaccinal" quantity with respect to the latter.

*Example 10.*—A fraction of fecal matter removed from stools of healthy human subjects is introduced directly into the following "bromocresol purple" culture medium:

| | |
|---|---|
| Para-amino-benzoic acid, g. | 0.04 |
| Yeast extract, g. | 1.5 |
| Trypsic peptone, g. | 15 |
| Bromocresol purple, g. | 0.04 |
| Powdered agar-agar, g. | 30 |
| Distilled water, ml. | 1000 |

The inoculated media are incubated at 37° C. during 24 hours. Portions of this culture are isolated by means of a sterile Pasteur pipette and identified as indicated below.

*Example 11.*—The procedure is the same as for Example 10, but instead of the bromocresol purple, the following "E.M.B." medium is used:

| | |
|---|---|
| Trypsic peptone, g. | 10 |
| Lactose, g. | 5 |
| Saccharose, g. | 5 |
| Dipotassium phosphate, g. | 2 |
| Powdered agar-agar, g. | 15.5 |
| Eosine Y (sold under commercial name of "Eosine Yellowish" by the National Aniline Co.), g. | 0.4 |
| Methylene blue, g. | 0.065 |
| Distilled water, ml. | 1000 |

*Example 12.*—A parcel of fecal matter is removed is in Examples 10 and 11, and introduced into the following enrichment medium known as "Muller Kauffman."

A carbonated meat broth is prepared with

| | |
|---|---|
| Meat broth, ml. | 90 |
| Calcium carbonate, g. | 5 | and autoclaved for 15 minutes at 110° C. 10 ml. of a 50% sodium hyposulfite solution autoclaved during 20 minutes at 120° C. is then added to it.

To this mixture are added 2 ml. of the following iodized solution (which needs not to be sterile):

| | |
|---|---|
| Iodine, g. | 20 |
| Potassium iodide, g. | 25 |
| Water, ml. | 100 |

1 ml. of a solution of "Brilliant" green, diluted to 1% in distilled water, and 5 ml. of sterilized bile are added to the new mixture.

The "Muller-Kauffman" medium so prepared and inoculated is shaken and distributed in sterile tubes.

After incubation at 37° C. during 24 hours, colonies found in this enrichment medium are removed by means of a Pasteur pipette and inoculated into the following medium for selection known as "Kristensen-Kauffman":

| | |
|---|---|
| Ordinary agar, 25%, ml. | 100 |
| Lactose, g. | 1.5 |
| NaOH, N/10, ml. | 40 |
| Phenol red, g. | 1 |
| Distilled water, ml. | 460 |

After a 24 hour incubation at 37° C., a growth of colibacilli is evident and these can be isolated and identified as indicated below, since they are subcultured in the following "nutrient" broth:

| | |
|---|---|
| Distilled water, ml. | 1000 |
| Minced meat, g. | 500 |

The meat is soaked in the cold water during 6 to 12 hours, and the broth is boiled during 15 minutes while stirring constantly. It is decanted and filtered through wet paper of the "Chardin" type.

15 to 20 g. of peptone and 5 g. of sodium chloride are added to the filtered broth. It is then boiled a few minutes and cooled to 60° C. The pH is adjusted to 7.6. It is autoclaved and filtered on "Chardin" paper and the liquid volume is brought up to 1000 ml. with distilled water. It is finally autoclaved during 15 minutes.

*Identification.*—Upon direct microscopical examination, the colibacilli are gram-negative and are moving and rod-shaped.

The following lactose agar is prepared:

| | |
|---|---|
| Para-amino-benzoic acid, g. | 0.04 |
| Yeast extract, g. | 1.5 |
| Trypsic peptone, g. | 15 |
| Lactose, g. | 15 |
| Powdered agar, g. | 30 |
| Distilled water, ml. | 1000 | to which are added a few drops of litmus liquid. This agar medium becomes blue-colored when the pH is adjusted to 7.8. 24 hours after inoculation it turns red, this being due to the lactose fermentation by the colibacilli.

Furthermore, the following "Hajna's" or "Kliger's" culture medium is prepared:

| | |
|---|---|
| 2% peptoned water, ml. | 1000 |
| Lactose, g. | 10 |
| Glucose, g. | 1 |
| Ammoniated ferrous sulfate, g. | 0.2 |
| $Na_2S_2O_3$, g. | 0.2 |
| 1% phenol red, ml. | 2.5 |
| Agar, g. | 15 |

The pH is adjusted to 7.6 and the medium is so distributed in tubes that the agar is 2 cm. thick at the bottom of the tube and thickened so as to form a slope.

After a 24 hour incubation at 37° C., the presence of gas as well as a reddish color are noticed in the culture, due to the fermentation of glucose and lactose by the colibacillus.

In peptoned water of the following formula:

| | |
|---|---|
| Distilled water, ml. | 1000 |
| Trypsic peptone, g. | 15 |
| Marine salt, g. | 5 | after inoculation with colibacilli and a 24 hour incubation, the presence of indole will be noted, which can be made evident by a reddening of the culture medium surface when one adds to it 5 drops of "Kovac's" or "Ehrlich's" reagent prepared by dissolving in the cold state 5 g. of paradimethylaminobenzaldehyde in 75 ml. of amyl alcohol and adding to it 25 ml. of hydrochloric acid.

No colibacillus growth will be observed after inoculation and incubation at 37° C. on the following "Simmons" culture medium:

| | |
|---|---|
| $MgSO_4$, g. | 0.2 |
| $K_2HPO_4$, g. | 1 |
| $NH_4H_2PO_4$, g. | 1 |
| Na citrate, g. | 2 |
| NaCl, g. | 5 |
| Agar, g. | 15 |
| Bromothymol blue, g. | 0.08 |
| Distilled water, ml. | 1000 |

The colibacilli cause no reddening of the medium after inoculation and a 6 hour incubation at 37° C. of the following "urea-indole" medium having a pH of 7.6:

| | |
|---|---|
| Trypsic peptone, g. | 10 |
| $K_2HPO_4$, g. | 2 |
| Glucose, g. | 10 |
| Water, ml. | 1000 |

The colibacilli do not induce the formation of acetyl-methyl-carbinol which corresponds to a negative result of the "Volkes-Proskauer" reaction. This reaction consists in adding 0.5 ml. of a 6% solution of α-naphthol (in 60° alcohol) and 1 ml. of the culture, and after shaking, in waiting 15 minutes. The appearance of a rose color reveals the presence of acetyl-methyl (carbinol).

Furthermore, in the medium "Salmonella-Shigella," the colonies of colibacilli have no black portions in the center nor black halos, for they bring about no formation of hydrogen sulfide.

These different biochemical characterizations allow a sure identification of the colibacilli.

In order to distinguish the non-pathogenic calibacillus it is placed in an agglutination serum from the Institut Pasteur, such as those sold commercially under the following names: Agglutination Pasteur serums: 111.B4, 55.B5, 26.B6, 86.B7, 119.B14, 127.B8, 125.B15, 126.B16, 128.B12. One drop of each precipitated serum is placed next to a drop containing the colibacillus suspension (in broth) on a glass slide. Each two drops are mixed with a sterile vaccinostyle (one vaccinostyle per mixture). The non-pathogenic colibacilli cause no agglutination, even after a limited period of time.

*Example 13.*—Upon isolating, according to Examples 10, 11, 12, a strain of non-pathogenic colibacilli, the strain is used for inoculation in a common medium together with another microorganism such as in Examples 1 to 9, and in a final culture medium enriched with vitamins and used for selection. The inoculation can also be done directly in the final culture medium, this eliminating the intermediate common medium.

To prepare this final medium, 1.1 volumes of solution in distilled water containing per liter about 2,500,000 I.U. of vitamin A, 500,000 I.U. of vitamin D2, 1 g. of tocopherol (vitamin E), 1 g. of thiamine hydrochlorate (vitamin $B_1$), 0.75 g. of vitamin $B_2$, 5 g. of nicotinamide (vitamin PP), 2 g. of sodium pentothenate (vitamin $B_5$), 1 g. of piridoxin (vitamin $B_6$), 25 g. of ascorbic acid (vitamin C), 50 ml. of polyoxyalkylene sorbitan monolaurate (an emulsifying agent sold commercially under the name of "Tween 20"), 50 g. of monosodium phosphate (buffer salt) and 5 ml. of a 30% aqueous solution of caustic soda are diluted with 4 volumes of an isotonic serum solution. 1 or 2 ml. of the "nutrient" broth cited previously can eventually be added to this medium. The pH of this medium is adjusted to about 7.5 and the medium is autoclaved for 10 minutes at 100° C. before inoculation.

The medium is amply inoculated with ½ to 1 ml. of grown culture as prepared in Examples 10 to 12 per 10 ml. of this vitamin enriched medium.

After 24 to 36 hours of incubation, there appears a prolific growth and the germ counting is performed according to the standard method. The number of bacteriae are eventually adjusted with sterile distilled water to the desired concentration for therapeutical use.

If such a culture is not used within a short time, it is distributed in vial ampules and lyophilized under aseptic conditions. Thus a safely preservable dehydrated product adapted for commercial use is obtained.

Regardless of the pharmaceutical form used, the biological activity of the germ is controlled through broth inoculation followed by agar inoculation in order to identify the germs so developed as described hereinabove.

In the above mentioned selective vitamin-enriched medium the strains of normal, non-pathogenic colibacilli grow selectively, whereas the colibacilli of the paracoli or coliform type originating from pathological substances such as purulent urine, hemocultures or abscess pus, as well as the pathogenic enterobacteriaceae such as "Salmonella," dysenteric bacilli, staphylococci and streptococci meet unfavorable conditions for their prolific growth.

According to another embodiment of the invention, it is possible to add to the vitamin-enriched medium cited above about 5 to 20% of a standard culture medium such as a protein hydrolysate prepared for example by diastasic action with the help of ereptine and papain.

This modified vitamin-enriched medium is less selective as regards the non-pathogenic colibacillus and different colibacilli can grow in it, but the Salmonella, dysenteriae, staphylococci and streptococci will not proliferate.

Regardless of the pharmaceutical form adopted, the biological activity of the germ as well as its purity is controlled through broth inoculation followed by agar inoculation and identification according to the reactions previously described.

The composition according to this invention, allows the reintroduction into the intestine of desirable microorganisms enhancing the vitamin synthesis in vivo, especially after use of antiseptics which are noxious to the intestinal flora, and for the treatment of enteric syndromes. The presence of said microorganisms in the intestinal tract stops the prolific growth of undesirable and pathogenic bacteria and normalizes the disturbed intestinal flora.

*Example 14.*—Re-inoculation of the intestine after use of antiseptics noxious to the intestinal flora.

Six doses were administered per day during 8 days, each dose enclosing five hundred million non-pathogenic colibacilli, freshly obtained from nutrient broth, to a patient suffering from an enteric syndrome with diarrhea, abdominal pains, and inflammation, this occurring after chloramphenicol absorption. The diarrhea disappeared progressively as well as the other pathological symptoms. The examination of the stools after treatment reversed the presence of intestinal flora where the colibacilli are the most abundant, while they had been quite rare in the stools of the sick patient, prior to the treatment.

*Example 15.*—Re-inoculation of the intestine at the end of antibiotic treatment in order to prevent intestinal infection by pathogenic germs.

Patients treated with streptomycin, tetracycline, and other antibiotics able to destroy the normal intestinal flora, were given, right from the first days of the antibiotic treatment, and during the eight following days, four daily doses of about a thousand million lyophilized germs. The intestinal troubles, frequently encountered with the use of antibiotics, were almost totally prevented among the patients. One patient treated with tetracyclin, streptomycin and chloramphenicol, and having been given lyophilized germs show no trouble 8 days after the end of the treatment.

*Example 16.*—Treatment of ordinary intestinal infections: A patient suffering from summer enteritis with diarrhea (six bowel movements per day) swellings, 38° C. fever, was given, as the sole treatment, during 8 days, two daily doses of about 2.5 thousand million germs freshly obtained in the vitamin-enriched culture medium previously cited. After 48 hours of treatment the pathological symptoms began to disappear progressively, and the normal functioning of the intestine was restored from the 5th day of treatment onwards.

Of course, the invention is not limited to the examples cited; variations and modifications can be made, according to the particular applications envisaged, without departing from the spirit of the invention.

Thus, the non-pathogenic colibacilli may be used under different standard medical forms and in association with other therapeutical substances especially antibiotics. The final culture medium may be complex; particularly it may enclose vitamins together with the standard nourishing substances. It may be constituted more particularly by the vitamin-enriched medium cited previously to which is added protein hydrolysate, or a standard culture broth.

An germ, microbe, fungus, yeast or any other microorganism, can be grown according to the present invention and become specifically active against one or several other microorganisms.

What is claimed is:

1. A process for obtaining from a population of living non-pathogenic microorganisms of one species selected from the group consisting of colibacilli, antibiotic-producing streptomyces, and antibiotic-producing penicillia having destructive properties directed against at least one other species of living microorganisms, a selected strain of said one species, in which said destructive properties are substantially stronger than in said population of organisms, said process consisting in carrying out a first cycle comprising the steps of placing microorganisms of said population and microorganisms of said other species into a common culture medium to provide a mixed culture of said micro-organisms of said one species and said other species; incubating said mixed culture; isolating from the incubated mixed culture a strain of surviving microorganisms of said one species; placing the isolated strain of microorganisms into another culture medium; and incubating said isolated strain in said other culture medium; and in carrying out at least one consecutive cycle comprising the steps of placing at least part of the incubated isolated strain of microorganisms of said one species together with microorganisms of said other into a new common culture medium to provide a new mixed culture of microorganisms of said one and said other species; incubating said new mixed culture in said new common culture a new strain of surviving microorganisms of said one species; placing the isolated new strain into a further culture medium and incubating said isolated new strain therein.

2. The process of claim 1, wherein the steps of incubating the mixed culture is carried out, in at least one of said cycles, until substantially all the microorganisms of said other species present in said common culture are destroyed by the microorganisms of said one species present in said common culture.

3. The process of claim 1, wherein the common culture medium which is used in at least one of said cycles for obtaining the common culture is more favorable to the development of the microorganisms of said one species than it is to the development of the microorganisms of said other species, said process comprising the further steps of incubating the microorganisms of said other species alone in said medium to adapt them thereto, prior to introducing and incubating said microorganisms of said other species together with those of said first species in said common culture medium.

4. The process of claim 1, comprising the further steps of incorporating the common culture medium which is used in at least one of said cycles for obtaining the common culture, a proteolysate of the microorganisms of said other species.

5. In a process for obtaining from a population of colibacilli a selected strain of non-pathogenic colibacilli having increased destructive properties directed against pathogenic staphylococci, one cycle comprising the steps of incubating at least part of said colibacilli population in a first broth to provide an initial colibacilli culture; incubating at least part of said staphylococci in a second broth to provide an initial staphylococci culture; placing a quantity of the incubated colibacilli and a quantity of the incubated staphylococci collected, respectively from said initial cultures, into a common culture medium to provide a common culture of said colibacilli and said staphylococci; incubating said common culture; isolating from said first common culture at least a part of the colibacilli having survived therein; and at least one consecutive cycle comprising the steps of placing a quantity of the isolated colibacilli together with a new quantity of staphylococci collected from said initial staphylococci culture into a new common culture medium to provide a new common culture of colibacilli and staphylococci; incubating said new common culture; and insolating from said new common culture at least a part of the colibacilli having survived therein.

6. In a process for obtaining from a population of colibacilli a selected strain of non-pathogenic colibacilli having increased destructive properties directed against pathogenic streptococci, one cycle comprising the steps of incubating at least part of said colibacilli population in a first broth to provide an initial colibacilli culture; incubating at least part of said streptococci in a second broth to provide an initial streptococci culture; placing a quantity of the incubated colibacilli and a quantity of the incubated streptococci collected, respectively from said initial cultures, into a common culture medium to provide a common culture of said colibacilli and said streptococci; incubating said common culture; isolating from said first common culture at least a part of the colibacilli having survived therein, and at least one consecutive cycle comprising the steps of placing a quantity of the isolated colibacilli together with a new quantity of streptococci collected from said initial streptococci culture into a new common culture medium to provide a new common culture of colibacilli and streptococci; incubating said new common culture, and isolating from said new common culture at least a part of the colibacilli having survived therein.

7. In a process for obtaining from a population of colibacilli a selected strain of non-pathogenic colibacilli having increased destructive properties directed against pathogenic *Candida albicans,* one cycle comprising the steps of incubating at least part of said colibacilli population in a first broth to provide an initial colibacilli culture; incubating at least part of said *Candida albicans* in a second broth to provide an initial *Candida albicans* culture; placing a quantity of the incubated colibacilli and a quantity of the incubated *Candida albicans* collected, respectively from said initial cultures, into a common culture medium to provide a common culture of said colibacilli and said *Candida albicans*; incubating said common culture; isolating from said common culture at least a part of the colibacilli having survived therein; and at least one consecutive cycle comprising the steps of placing a quantity of the isolated colibacilli together with a new quantity of *Candida albicans* collected from said initial *Candida albicans* culture into a new common culture medium to provide a new common culture of colibacilli and *Candida albicans*; incubating said new common culture; and isolating from said new common culture at least a part of the colibacilli having survived therein.

8. In a process for obtaining from a population of colibacilli a selected strain of non-pathogenic colibacilli having increased destructive properties directed against pathogenic Klebsiella and Shigella, one cycle comprising the steps of incubating at least part of said colibaccilli population in a first broth to provide an initial colibacilli culture, incubating at least part of said Klebsiella and Shigella in a second broth to provide an initial Klebsiella and Shigella culture; placing a quantity of the incubated colibacilli and a quantity of the incubated Klebsiella and Shigella collected, respectively from said initial cultures, into a common culture medium to provide a common culture of said colibacilli and said Klebsiella and Shigella; incubating said common culture; isolating from said first common culture at least a part of the calibacilli having survived therein; and at least one consecutive cycle comprising the steps of placing a quantity of the isolated colibacilli together with a new quantity of Klebsiella and Shigella collected from said initial Klebsiella and Shigella culture into a new common culture medium to provide a new common culture of colibacilli and Klebsiella and Shigella; incubating said new common culture; and isolating from said new common culture at least a part of the colibacilli having survived therein.

9. The process of claim 5, wherein said population of colibacilli is obtained by introducing fecal matter of a healthy human subject into a culture medium to provide a culture, incubating said culture, and isolating non-pathogenic colibacilli therefrom.

10. The process of claim 6, wherein said population of colibacilli is obtained by introducing fecal matter of a healthy human subject into a culture medium to provide a culture, incubating said culture, and isolating non-pathogenic colibacilli therefrom.

11. The process of claim 7, wherein said population of colibacilli is obtained by introducing fecal matter of a healthy human subject into a culture medium to provide a culture, incubating said culture, and isolating non-pathogenic colibacilli therefrom.

12. The process of claim 8, wherein said population of colibacilli is obtained by introducing fecal matter of a healthy human subject into a culture medium to provide a culture, incubating said culture, and isolating non-pathogenic colibacilli therefrom.

13. In a process for obtaining from a population of streptomyces a selected strain of streptomyces having increased destructive properties directed against pathogenic staphylococci, one cycle comprising the steps of incubating at least part of said streptomyces population in a first broth to provide an initial streptomyces culture; incubating at least part of said staphylococci in a second broth to provide an initial staphylococci culture; placing a quantity of the incubated streptomyces and a quantity of the incubated staphylococci collected, respectively, from said initial cultures, into a common culture medium to provide a common culture of said streptomyces and said staphylococci; incubating said common culture; isolating from said first common culture at least a part of the streptomyces having survived therein; and at least one consecutive cycle comprising the steps of placing a quantity of the isolated streptomyces together with a new quantity of staphylococci collected from said initial staphylococci culture into a new common culture medium to provide a new common culture of streptomyces and staphylococci; incubating said new common culture; and isolating from said new common culture at least a part of the streptomyces having survived therein.

References Cited by the Examiner

UNITED STATES PATENTS 3,071,518  1/1963  Scherr et al. _____ 195—78

OTHER REFERENCES

Lacey: "Mechanisms of Chemotherapeutic Synergy," in "The Strategy of Chemotherapy," 8th Symposium of the Society for General Microbiology, published 1958, Cambridge University Press, Cambridge, England, pages 247–262, 268–270.

A. LOUIS MONACELL, *Primary Examiner.*

JULIUS S. LEVITT, S. K. ROSE, D. M. STEPHENS,
*Examiners.*